United States Patent Office 2,894,590
Patented July 14, 1959

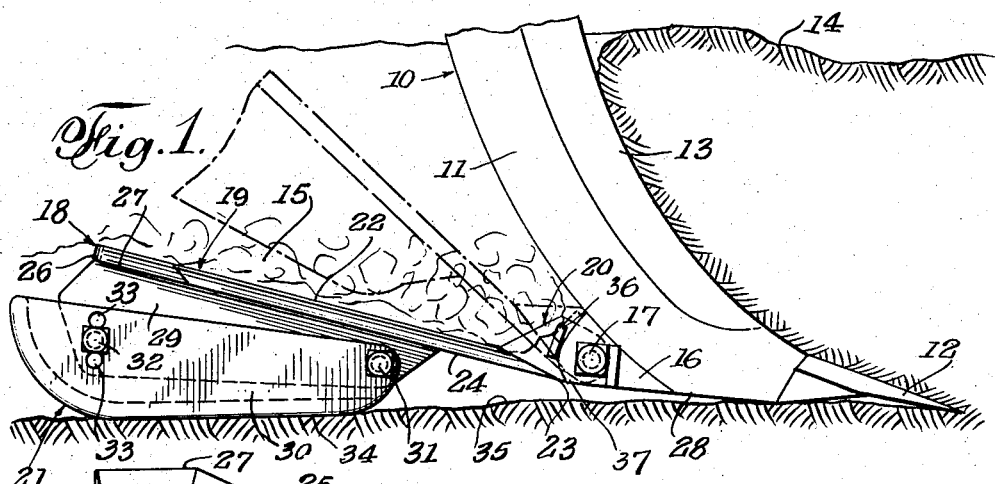
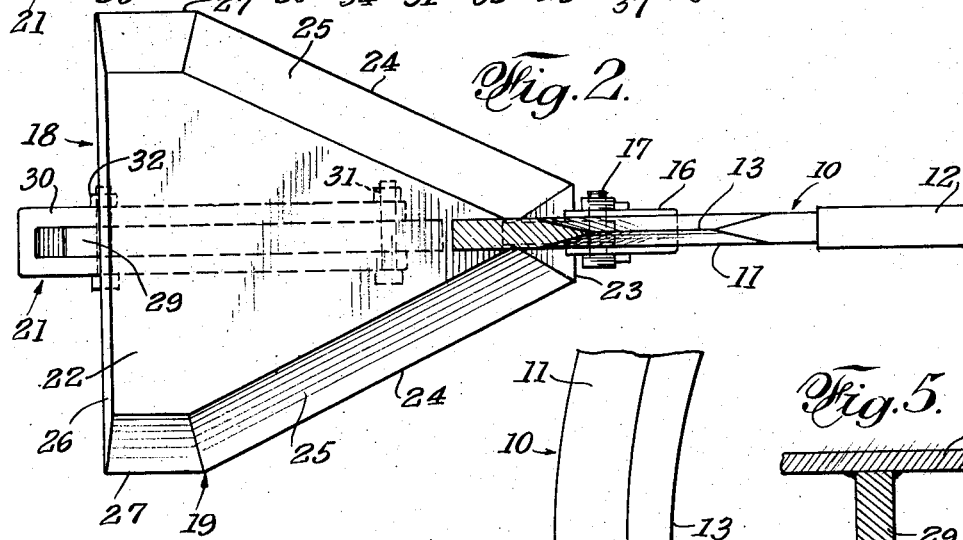
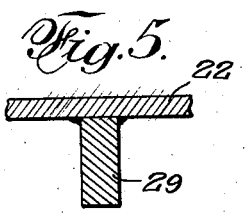
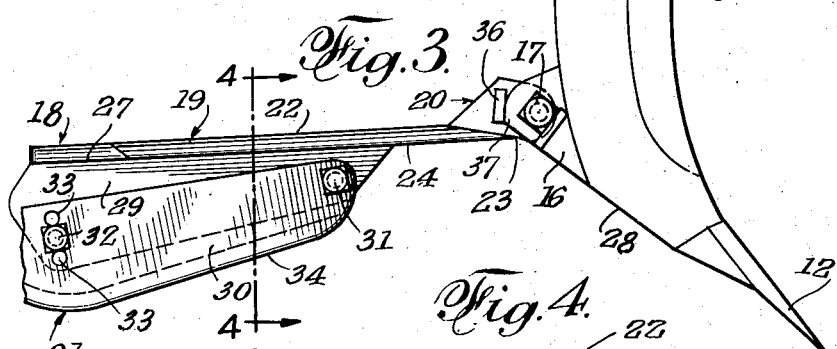
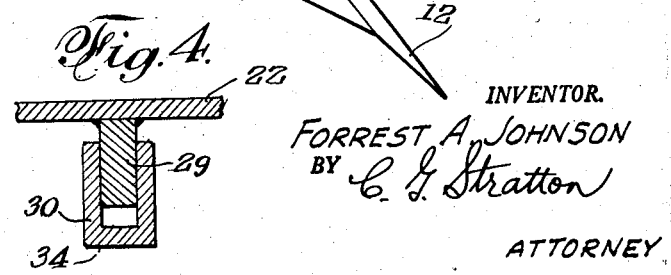
INVENTOR.
FORREST A. JOHNSON
BY C. G. Stratton
ATTORNEY

2,894,590

SOIL BREAKER

Forrest A. Johnson, Orosi, Calif., assignor to Double-J Breaker Co., Bell, Calif., a corporation of California Application May 22, 1957, Serial No. 660,948

12 Claims. (Cl. 172—194)

This invention relates to a soil breaker of the type that is adapted to travel underneath the surface of the earth.

The type of soil breaker that has heretofore been in use embodies a vertical shank approximately two inches in width, with a depth of two or three feet, and which is pulled through the earth by a tractor. This type of tool is known as a ripper or rooter, and generally has a forwardly projecting pointed arm that is mounted at the bottom of said shank, and that is adapted to penetrate the earth as the tractor pulls the ripper through the earth from above.

There are several different disadvantages with rippers or rooters, as above described. The first, and probably most important of these, is that the narrow width of such rooters does not make them effective over a very wide area. In effect, they produce results such as would be expected from an oversized rake, for when they are pulled through the earth they merely produce a series of narrow trenches therein. While the earth is broken immediately adjacent the shanks, it is generally not broken in the area in between the shanks of adjacent rooters when a plurality of rooters is used at one time. Yet it is not practical to use too many rooters in combination at one time, since the power required to pull them through the earth prohibits efficient and economic operation.

Another disadvantage of such rooters is that the forwardly projecting arm often strikes a hard object underneath the surface of the earth, and is thereby deflected. This deflection of the arm often causes the shank of the rooter to bend and become distorted, resulting both in damage to the rooter and in unproductive results. Another disadvantage of such rooters results from the fact that the narrow width of the soil that is broken makes it necessary to pass over an area of land several times before the soil is sufficiently broken.

Having the above disadvantages in mind, it is an object of the present invention to provide a soil breaker that is adapted to be attached to the shank of the rooter and to be drawn thereby through the earth at a predetermined level under the surface thereof.

Another object of the invention is to provide a soil breaker that can be attached to a rooter to break a width of soil substantially wider than both the width of the rooter and of the soil breaker.

Another object of the invention is to provide a soil breaker that will travel at a predetermined depth underneath the surface of the earth and that will break the soil underneath the surface without substantially breaking the surface.

Another object of the invention is to provide a soil breaker having a shape that will permit it to drive itself to a predetermined depth under the surface of the earth and which will remain at that depth without having a tendency to be drawn back to the surface.

Another object of the invention is to provide a soil breaker having a shape that will permit it to travel underneath the surface of the earth when pulled in one direction, and that will move back to the surface of the earth when moved in a reverse direction.

Another object of the invention is to provide a soil breaker that can break a wide area of soil and yet can be pulled through the soil without the need to expend a large quantity of power.

Another object of the invention is to provide a soil breaker having a shape that will permit it to cut through hard pan, shale, decomposed granite and other hard earth formations without undue difficulty.

Having the foregoing objects in mind, the present invention is peculiarly adapted for use in heavy construction, where it is often desired to use grading equipment in the removal of large quantities of earth. By the use of the soil breaker herein described, a tractor can pull a plurality of such soil breakers through the earth and break a large area of ground so that the scrapers can come along and remove the same without difficulty. It is possible by the use of the soil breaker herein disclosed to make only one pass over the ground and yet have the ground sufficiently broken so that the scrapers can remove the desired quantity of earth. By the use of rooters alone, without having the soil breaker attached, it is usually necessary to make several passes over the earth before the desired quantity of earth can be removed by the scrapers.

The present soil breaker also may be adapted for a variety of agricultural uses. For example, when it is desired to renovate a pasture, the soil breaker can be drawn through the pasture and break the soil underneath the surface so that it will be capable of absorbing a greater quantity of water than before the soil was broken. When used for this purpose, it should be noted that, while the soil underneath the surface is broken, the soil on the surface is not broken, except for a narrow trench, so that the pasture is largely undisturbed.

As another example, the soil breaker can be used by planters who wish to plant a vineyard or orchard. Likewise, a string of soil breakers can be drawn between adjacent rows of crops, or even on open land, to cultivate the same. Thus, the roots of the plants that are planted have an opportunity to easily penetrate the earth surrounding them.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows, and the following description merely describes, preferred embodiments of the present invention, which are given by way of illustration or example only.

In the drawing, like reference characters designate similar parts in the several views.

Fig. 1 is a side elevational view showing the present soil breaker in operative position and attached to a rooter.

Fig. 2 is a plan view of the combined soil breaker and rooter as in Fig. 1.

Fig. 3 is a side elevational view showing the position assumed by the soil breaker when the rooter is elevated out of the ground.

Fig. 4 is a fragmentary cross-sectional view as taken on line 4—4 of Fig. 3.

Fig. 5 is a similar sectional view of a modification.

The rooter 10 that is illustrated comprises a shank 11 that is provided at its lower end with a forwardly projecting and preferably hardened and replaceable tooth 12 and with a sharpened leading edge 13. It will be understood that the rooter 10, by the upper end thereof that is not shown, may be secured to a tractor or other vehicle by means of which said rooter may be drawn in a direction toward the right. When so moved, the tooth 12 and sharpened edge 13 cooperate to cut a trench in the ground 14 that is approximately as wide as the tooth and the shank 11. A slight amount of soil loosening on each side of the rooter will result from such movement thereof but the same will be relatively small in degree. In the main, the soil thus loosened will fill in behind the shank, as suggested by the loosened material at 15.

A clevis 16 is fixedly provided on the lower end of shank 11 rearward of the tooth 12, the same, in the usual way, being provided with holes to receive a hinge pin or bolt 17. In practice, and as shown in Fig. 1, the rooter is so disposed in soil-rooting position that the tooth 12 thereof is lowermost and said clevis 16, therefore, trails through soil loosened by said tooth and adjacent portions of the shank 11.

According to the present invention, a soil breaker 18 is hingedly connected to the rooter 10, as by means of the bolt 17, said soil breaker comprising, generally, a flat body 19, an ear 20 on the forward end of the body and adapted to connect to the hinge bolt 17, and a heel 21 depending from the body.

The body 19 that is illustrated comprises a plate 22 of approximately triangular shape and having a forward or leading apex 23 to which the ear 20 is affixed. Said plate, from the apex 23, widens along sharpened edges 24 defined by bevels 25 that slope outwardly and downwardly from the upper surface of plate 22. The rear or trailing edge 26 need not be bevelled. The corners where the edges 24 meet rear edge 26 may be truncated as at 27 and the same, as shown, may be bevelled according to the bevels 25.

The ear 20 extends normal to the upper face of the plate 22 and transverse to the trailing edge 26, thereby having a central longitudinal position which, if extended to the edge 26, would divide the plate into symmetrical halves. With said ear in the clevis 16 and bolt 17 extending through the hole thereof, the plate 22 has a central symmetrical relationship to the rooter and trails the same.

From comparison of Figs. 1 and 3, it will be clear that plate 22 may swing between a depending position (Fig. 3) that defines an included angle between itself and the lower end 28 of the rooter shank 11, and a position (Fig. 1) wherein there is substantial alignment between said end 28 and plate 22. In practice, the angular disposition of the plate 22 with respect to the rooter shank may vary between the mentioned alignment with end 28 and an angular displacement from such alignment, providing that the angle of said plate with respect to the horizontal is such as to locate its leading edge or apex 23 in lowermost position. Also, it is preferred that edge 23 be located slightly above the leading edge of the rooter tooth 12 so that said edge moves through soil loosened by said tooth.

While Fig. 3 shows the lowermost or depending position of the plate 22, Fig. 1 does not show the most elevated position of the plate, but rather an intermediate one that is assumed under a certain condition. Actually, the plate 22 may rise to a more elevated position on the pivot bolt 17 so that its angle to the horizontal is increased so as to be greater than the one shown in Fig. 1. Such a position is shown in Fig. 1 in dot-dash lines.

The heel 21 is shown as adjustable so as to enable adjustment of the operating angle of the plate 22. The heel that is illustrated in Figs. 1 to 4 comprises a longitudinal and preferably central rib 29 depending from the plate 22, an adjustable heel part 30, shown as having a channel cross-section and engaged around said rib, as in Fig. 5, a hinge bolt 31 connecting the forward end of the rib and heel member, and a bolt or the like 32 connecting the trailing portions of said rib and heel member, said bolt 32 extending through a hole in the rib and, selectively, through one pair of aligned holes 33 of a plurality of pairs. It will be realized that the wear edge 34 of the member 30 can be adjusted so that the angle included between said edge and the plate 22 may be varied.

The modification of Fig. 5 omits the member 30 and, therefore, the bolts 31 and 32. Such a soil breaker would not have the adjustability of the one described above.

When the rooter-soil breaker combination above described is to be entered into the soil or ground 14, the same has the position of Fig. 3 with the soil breaker hanging at a rearward, downward angle, as shown. As the tooth 12 enters the ground, the heel 21, by engaging the top surface of the ground, supports the trailing portion of the soil breaker. Thus, as the tooth 12 continues farther into the ground, the soil breaker becomes upwardly tilted, as in the dot-dash line position of Fig. 1, with the apex 23 thereof pointed downwardly.

Since the heel part 30 is not materially wider than the tooth 12, the same, under the weight or force that is pushing the rooter into the ground, is drawn into the ground. The curved forward end of said part 30 aids such penetration. As a consequence, when the rooter 10 is pulled forwardly by its towing vehicle, the soil breaker is immediately effective to break soil behind the shank 11. Inasmuch as the broken soil presses against the upper face of the plate 22, the soil breaker is biased to the full-line position of Fig. 1 wherein the heel part 30 is supported by the undisturbed surface 35 of the ground immediately beneath the rooter tooth 12.

It will be realized that the adjustment of said heel part 30 relative to the plate 22 determines the forward and downward angle at which the latter is presented, thereby controlling the amount or degree of soil breakage that results from upward displacement of the soil by the plate 22. Also, it will be noted that the soil breaker, in operative position, is full floating and may deflect or accommodate itself to obstructions that may be in its path of movement, thereby minimizing damage.

The depending position of the soil breaker, shown in Fig. 3, is limited by engagement of a cleat 36 on the ear 20 and a stop or the like 37 on the clevis 16. Of course, other stop or limiting means may be used so that the soil breaker may be held in position ready for its heel to engage the top of ground 14 when tooth 12 is entered into said ground. As will be seen, the remaining portion of the clevis 16 is so formed or rounded over to allow full angular adjustment of the soil breaker, so as to carry out the mode of operation above outlined.

This application discloses a species of the same generic invention as my pending application, Serial No. 595,213, filed July 2, 1956 and bearing the same title, now abandoned.

While the foregoing has illustrated and described what are now contemplated to be the best modes of carrying out my invention, the constructions are, of course, subject to modification without departing from the spirit and scope of the invention. It is, therefore, not desired to restrict the invention to the particular forms of construction illustrated and described, but to cover all modifications that may fall within the scope of the appended claims.

Having thus described my invention, what I claim and desire to secure by Letters Patent is:

1. A soil breaker comprising a flat, generally triangular plate member having a forwardly directed ground-penetrating apex, a hinge part adjacent to said apex and adapted for pivotal connection to a rooter or ripper, cutting a trench to a predetermined depth to hold said plate member in position to trail freely behind the rooter or ripper during soil-ripping movement of the latter, and a heel carried by and beneath said triangular plate member at the bottom of such trench and disposed longitudinally of the direction of movement of the rooter or ripper, said heel having a substantially straight wear edge to ride horizontally along the surface of the ground at the bottom of such trench immediately below the soil loosened by the rooter or ripper, said edge and the triangular plate member including an acute angle therebetween, for causing the member, while trailing, to assume a soil-breaking forwardly inclined angle with respect to said ground surface.

2. A soil breaker according to claim 1 in which the heel is provided with an adjustable portion on which said wear edge is provided, and means to angularly adjust said portion to vary the acute angle as desired.

3. A soil breaker according to claim 1 in which the edges of the triangular plate member that extend rearward of the mentioned forwardly directed apex are sharpened.

4. A soil breaker according to claim 3 in which the heel is provided with an adjustable portion on which said wear edge is provided, and means to angularly adjust said portion to vary the acute angle as desired.

5. A soil breaker comprising a flat, generally triangular plate member, said member having an apex thereof forwardly directed and said apex being bevelled for earth-penetrating facility, a heel spaced rearwardly from the mentioned apex and directed longitudinally along the under face of the plate member, and a pivot ear above said apex for connection to draft mechanism, said heel having a wear edge that forms an acute angle with the plate member to hold said latter member at a forwardly inclined angle with respect to a surface along which the heel moves during soil breaking movement of the soil breaker when the breaker is drawn at said ear.

6. A soil breaker according to claim 5 in which the heel is provided with an adjustable portion on which said wear edge is provided, and means to angularly adjust said portion to vary the acute angle as desired.

7. A soil breaker according to claim 5 in which is provided means to pivotally connect the apex end of the plate member to a rooter or ripper, the pivotal connection affording free angular movement of the plate in a plane transverse to the general plane of the plate.

8. A soil breaker according to claim 5 in which is provided means to pivotally connect the apex end of the plate member to a rooter or ripper, the pivotal connection affording free angular movement of the plate in a plane transverse to the general plane of the plate, and means adjacent the hinge to limit the angular extent of such free angular movement.

9. A soil breaker comprising a triangular plate having a soil-penetrating apex and divergent, sharpened, soil-cutting edges extending from said apex, a pivot ear above said apex for connection to draft mechanism, and a longitudinal rib affixed to the under surface of the plate centrally and symmetrical with respect to the soil-cutting edges, said rib having a lower edge that defines an acute angle with the general plane of said triangular plate.

10. A soil breaker comprising a triangular plate having a soil-penetrating apex and divergent, sharpened, soil-cutting edges extending from said apex, a pivot ear above said apex for connection to draft mechanism, and a longitudinal rib affixed to the under surface of the plate centrally and symmetrical with respect to the soil-cutting edges, and a wear member carried by said rib and having a lower wear edge that defines an acute angle with the general plane of the triangular plate.

11. A soil breaker comprising a triangular plate having a soil-penetrating apex and divergent, sharpened, soil-cutting edges extending from said apex, a pivot ear above said apex for connection to draft mechanism, and a longitudinal rib affixed to the under surface of the plate centrally and symmetrical with respect to the soil-cutting edges, a wear member carried by said rib and having a lower wear edge that defines an acute angle with the general plane of the triangular plate, and means to adjust the wear member relative to the rib to adjust the degree of said acute angle.

12. Soil breaking apparatus, comprising in combination, a shank adapted to be pulled forward by draft mechanism, the shank having a lower end projecting forwardly with a tooth thereon, and pivotal connecting means located on the shank slightly above the depth of the tooth, and a triangular plate having a soil-penetrating apex and divergent sharpened soil-cutting edges extending from said apex with a pivot ear above said apex pivotally connected to said shank-connecting means and a longitudinal rib affixed to the under surface of the plate centrally and symmetrical with respect to the soil-cutting edges, said rib having a lower edge that defines an acute angle with the general plane of said triangular plate.

References Cited in the file of this patent

UNITED STATES PATENTS

| | | |
|---|---|---|
| 129,057 | Rickard | July 16, 1872 |
| 175,200 | Swaney | Mar. 21, 1876 |
| 257,804 | Wright | May 9, 1882 |
| 377,998 | Estep | Feb. 14, 1888 |
| 1,573,988 | Montgomery | Feb. 23, 1926 |
| 2,690,113 | Altgelt et al. | Sept. 28, 1954 |